(12) United States Patent
Oki

(10) Patent No.: US 7,648,204 B2
(45) Date of Patent: Jan. 19, 2010

(54) RECLINER ADJUSTER

(75) Inventor: Yasukazu Oki, Hiroshima (JP)

(73) Assignee: Delta Kogyo Co., Ltd., Hiroshima (JP)

( * ) Notice: Subject to any disclaimer, the term of this patent is extended or adjusted under 35 U.S.C. 154(b) by 493 days.

(21) Appl. No.: 11/317,080

(22) Filed: Dec. 27, 2005

(65) Prior Publication Data

US 2006/0170269 A1    Aug. 3, 2006

(30) Foreign Application Priority Data

Dec. 28, 2004   (JP)   ............................. 2004-379630
Oct. 19, 2005   (JP)   ............................. 2005-304717

(51) Int. Cl.
    *B60N 2/235*    (2006.01)
(52) U.S. Cl. .................................................. 297/367 L
(58) Field of Classification Search .............. 297/361.1, 297/362, 367–369, 463.1
    See application file for complete search history.

(56) References Cited

U.S. PATENT DOCUMENTS

| | | | |
|---|---|---|---|
| 3,557,633 A | 1/1971 | Frerichs | |
| 4,457,556 A | 7/1984 | Klingelhöfer | |
| 4,634,181 A * | 1/1987 | Pipon | 297/362 |
| 4,770,464 A * | 9/1988 | Pipon et al. | 297/367 |
| 4,813,853 A | 3/1989 | Otto et al. | |
| 4,836,606 A * | 6/1989 | Werner | 297/362 |
| 5,267,918 A | 12/1993 | Shiroyama | |
| 5,451,096 A * | 9/1995 | Droulon | 297/463.1 |
| 5,531,504 A * | 7/1996 | Schmale et al. | 297/362 |
| 5,590,931 A | 1/1997 | Fourrey et al. | |
| 5,611,599 A | 3/1997 | Baloche et al. | |
| 5,755,491 A * | 5/1998 | Baloche et al. | 297/362 |

(Continued)

FOREIGN PATENT DOCUMENTS

DE    26 09 607    11/1979

(Continued)

OTHER PUBLICATIONS

Patent Abstracts of Japan, vol. 2000, No. 15, Apr. 6, 2001 & JP 2000 333758 A (Ikeda Bussan Co., Ltd.), Dec. 5, 2000.

(Continued)

*Primary Examiner*—Peter R. Brown
(74) *Attorney, Agent, or Firm*—Wenderoth, Lind & Ponack, L.L.P.

(57) ABSTRACT

A recliner adjuster includes a guide bracket to be fixed to one of a seat cushion and a seat back that can pivot with respect to the seat cushion, an internal gear to be fixed to the other of the seat cushion and the seat back, a cam interposed between the guide bracket and the internal gear, a pair of lock gears radially slidable in association with an operation of the cam, and a mounting ring for assembling the guide bracket and the internal gear together with the cam and the pair of lock gears interposed therebetween. The mounting ring has a flat annular portion and a cylindrical side portion joined to one of the guide bracket and the internal gear. An outer peripheral surface of the other of the guide bracket and the internal gear is held in sliding contact with an inner surface of the cylindrical side portion of the mounting ring to thereby radially position the other of the guide bracket and the internal gear.

11 Claims, 12 Drawing Sheets

U.S. PATENT DOCUMENTS

| | | | |
|---|---|---|---|
| 5,871,414 A | 2/1999 | Voss et al. | |
| 6,007,153 A | 12/1999 | Benoit et al. | |
| 6,082,821 A | 7/2000 | Baloche et al. | |
| 6,092,874 A | 7/2000 | Kojima et al. | |
| 6,149,235 A * | 11/2000 | Fahim | 297/259.2 |
| 6,312,053 B1 * | 11/2001 | Magyar | 297/367 |
| 6,454,354 B1 | 9/2002 | Vossmann et al. | |
| 6,520,583 B1 * | 2/2003 | Bonk | 297/367 |
| 6,609,756 B2 * | 8/2003 | Kojima et al. | 297/367 |
| 6,769,740 B2 * | 8/2004 | Yamada | 297/366 |
| 6,799,806 B2 | 10/2004 | Eppert et al. | |
| 2002/0096924 A1 | 7/2002 | Reubeuze | |
| 2003/0067205 A1 | 4/2003 | Eppert et al. | |
| 2003/0214165 A1 | 11/2003 | Finner et al. | |
| 2004/0036337 A1 | 2/2004 | Hoshihara et al. | |

FOREIGN PATENT DOCUMENTS

| | | |
|---|---|---|
| DE | 198 14 225 | 10/1998 |
| DE | 199 18 864 | 10/1999 |
| DE | 199 04 300 | 8/2000 |
| DE | 103 05 407 | 8/2004 |
| EP | 0 694 434 | 1/1996 |
| FR | 2 841 111 | 12/2003 |
| JP | 2653768 | 5/1997 |
| JP | 2000-333758 | 12/2000 |
| JP | 2002-119352 | 4/2002 |
| JP | 2004-081345 | 3/2004 |

OTHER PUBLICATIONS

Supplemental European Search Report dated Apr. 22, 2009 in corresponding European Application No. 09 15 0118.

Supplemental European Search Report dated Apr. 22, 2009 in corresponding European Application No. 09 15 0120.

European Office Action (Grounds for Opposition) issued Apr. 29, 2009 in EP 1 676 502 which is a foreign counterpart to the present application (with English translation).

* cited by examiner

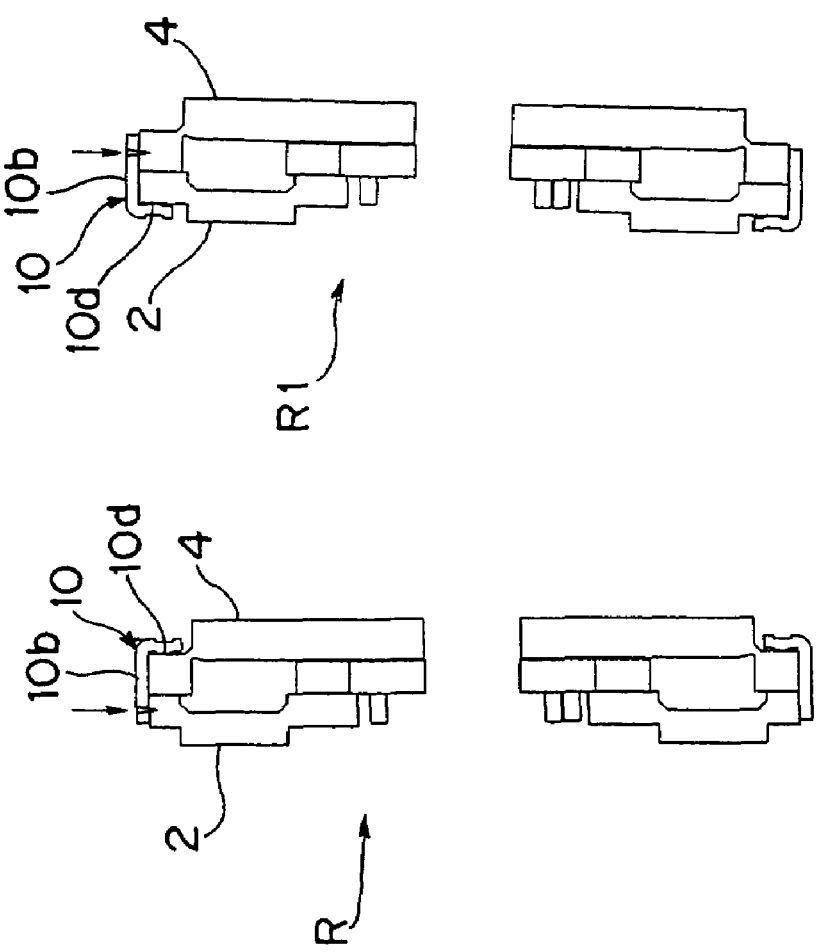
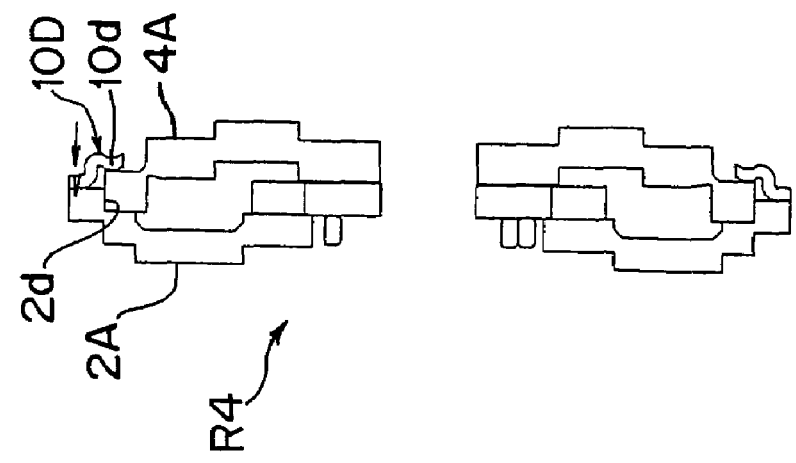
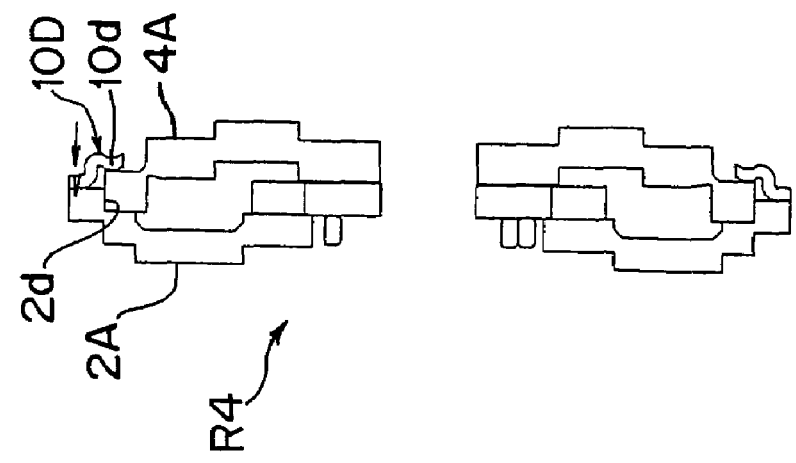

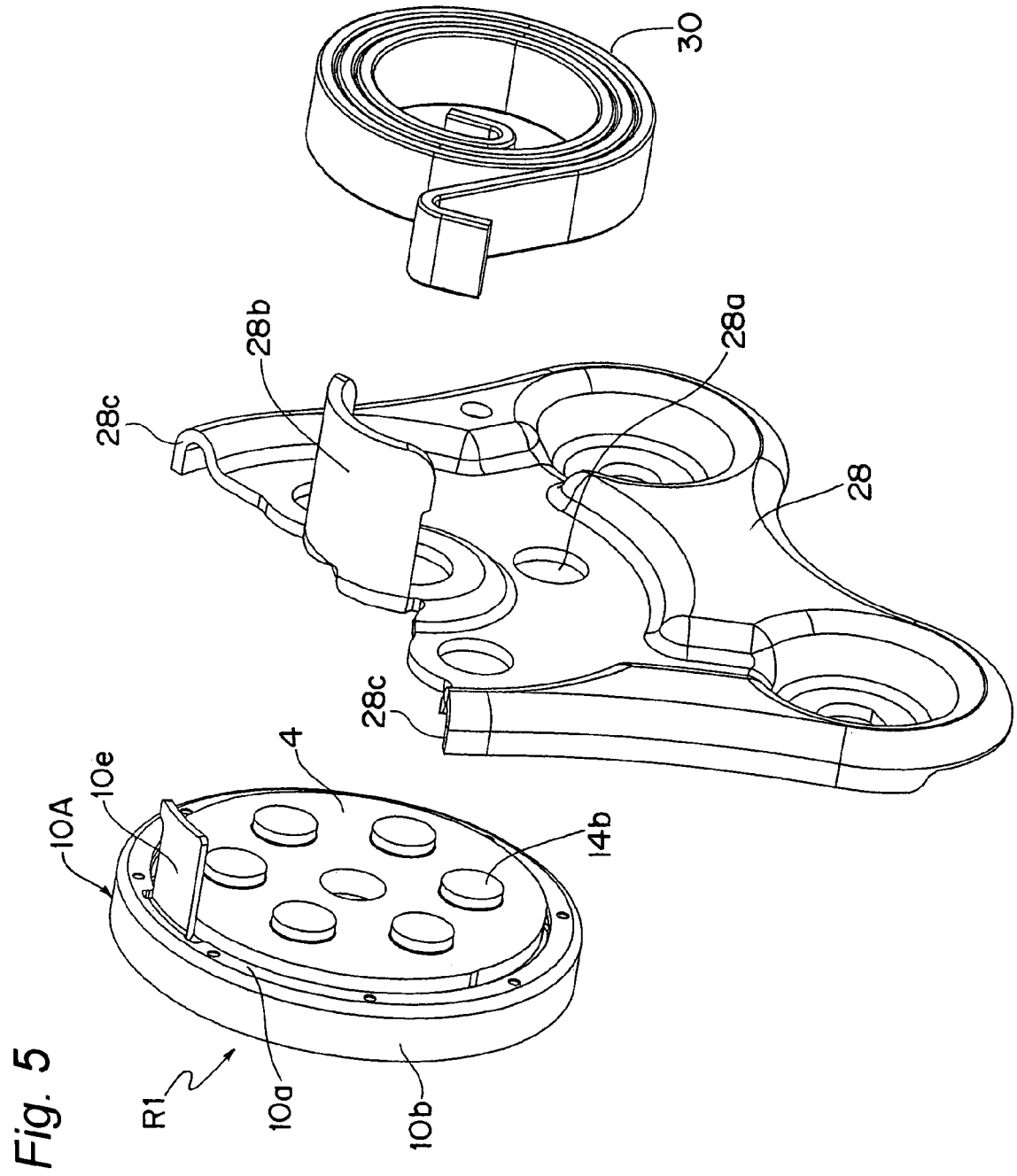

RECLINER ADJUSTER

BACKGROUND OF THE INVENTION

1. Field of the Invention

The present invention relates to a recliner adjuster attached to, for example, an automobile seat for appropriately adjusting an inclination of a seat back with respect to a seat cushion.

2. Description of the Related Art

A conventional recliner adjuster interposed between a seat cushion and a seat back includes a base member secured to the seat cushion, a rotary arm secured to the seat back and rotatably supported by the base member, a lock mechanism for locking the rotation of the rotary arm, and an operating lever for releasing the locking by the lock mechanism. A ring member is provided at an outer peripheral portion of the base member to hold the rotary arm.

The ring member has a collar formed at an outer peripheral edge thereof, which is caulked to rotatably hold the rotary arm within the base member (see, for example, Patent Document 1).

A recliner adjuster having a memory mechanism, which acts to return the seat back to an original inclination after it has been once set to a predetermined angle (the original inclination) and subsequently inclined forwardly, has been proposed. This recliner adjuster includes a reclining mechanism disposed on one side of a guide bracket and a memory mechanism disposed on the other side of the guide bracket. The reclining mechanism and the memory mechanism are assembled together by caulking a mounting ring disposed on one side of the memory mechanism remote from the reclining mechanism to a fixing plate constituting the reclining mechanism (see, for example, Patent Document 2).

Japanese Laid-Open Patent Publication No. 2000-333758

Japanese Patent No. 2653768

In the recliner adjuster as disclosed in Patent Document 1 referred to above, because the base member and the rotary arm are held together by caulking a portion of the ring member with the rotary arm received in the base member, the outer diameter of the base member inevitably increases and, hence, it is difficult to reduce the size thereof while maintaining a predetermined locking strength to reduce the weight and manufacturing cost of the recliner adjuster.

In the case of the recliner adjuster as disclosed in Patent Document 2, the mounting ring must be mounted on both the reclining mechanism and the memory mechanism with a predetermined minimum clearance provided therebetween, and this cannot be easily accomplished by the caulking.

SUMMARY OF THE INVENTION

The present invention has been developed to overcome the above-described disadvantages.

It is accordingly an objective of the present invention to provide an easy-to-assemble recliner adjuster that can be reduced in size without reducing the locking strength to thereby reduce the weight and manufacturing cost thereof.

In accomplishing the above and other objectives, the recliner adjuster according to the present invention includes a guide bracket to be fixed to one of a seat cushion and a seat back that can pivot with respect to the seat cushion, an internal gear to be fixed to the other of the seat cushion and the seat back, a cam interposed between the guide bracket and the internal gear, a pair of lock gears radially slidable in association with an operation of the cam, and a mounting ring for assembling the guide bracket and the internal gear together with the cam and the pair of lock gears interposed therebetween. The mounting ring has a flat annular portion and a cylindrical side portion joined to one of the guide bracket and the internal gear. An outer peripheral surface of the other of the guide bracket and the internal gear is held in sliding contact with an inner surface of the cylindrical side portion of the mounting ring to thereby radially position the other of the guide bracket and the internal gear.

In the case where the diameter of the internal teeth of the internal gear is the same as that of internal teeth of an internal gear mounted in the recliner adjuster as disclosed in, for example, Patent Document 1 or 2 referred to above, the above-described construction can reduce the outer diameter of the recliner adjuster without reducing the locking strength, making it possible to reduce the weight and manufacturing cost of the recliner adjuster.

The cylindrical side portion of the mounting ring is joined to the guide bracket or the internal gear by laser welding or $CO_2$ welding.

The mounting ring may be made up of a plurality of mounting ring segments, adjacent portions of which are joined to the guide bracket or the internal gear.

The recliner adjuster also includes a spring retainer provided on the mounting ring and a spiral spring for biasing the seat back forwardly, wherein the spiral spring is retained at one end thereof by a seat cushion side bracket and at the other end thereof by the spring retainer.

Advantageously, a movable range of the spring retainer is restricted by two portions of the seat cushion side bracket, thereby restricting a rotating range of the guide bracket with respect to the internal gear.

In another aspect of the present invention, the recliner adjuster includes an internal gear to be fixed to one of a seat cushion and a seat back that can pivot with respect to the seat cushion, an external gear to be fixed to the other of the seat cushion and the seat back and held in engagement with the internal gear, a pair of wedge-shaped members for holding engagement between external teeth of the external gear and internal teeth of the internal gear, an elastic member for biasing the pair of wedge-shaped members in a direction in which the external teeth of the external gear and the internal teeth of the internal gear engage with each other, and a mounting ring for assembling the external gear and the internal gear together with the pair of wedge-shaped members and the elastic member interposed therebetween. The mounting ring has a flat annular portion and a cylindrical side portion joined to one of the external gear and the internal gear.

The cylindrical side portion of the mounting ring is joined to the external gear or the internal gear by laser welding or $CO_2$ welding.

The mounting ring may be made up of a plurality of mounting ring segments, adjacent portions of which are joined to the external gear or the internal gear.

In a further aspect of the present invention, the recliner adjuster includes a guide bracket to be fixed to one of a seat cushion and a seat back that can pivot with respect to the seat cushion, the guide bracket having a round recess defined therein, an internal gear to be fixed to the other of the seat cushion and the seat back, the internal gear being received within the round recess in the guide bracket, a cam interposed between the guide bracket and the internal gear, a pair of lock gears radially slidable in association with an operation of the cam, and a mounting ring for assembling the guide bracket and the internal gear together with the cam and the pair of lock gears interposed therebetween. The mounting ring is joined to the guide bracket so that the internal gear is rotatably held by the guide bracket and the mounting ring.

This construction can reduce the size of the recliner adjuster without reducing the locking strength, making it possible to reduce the weight and manufacturing cost of the recliner adjuster.

The mounting ring is preferably joined to the guide bracket by laser welding.

In a still further aspect of the present invention, the recliner adjuster includes a guide bracket, a reclining mechanism disposed on one side of the guide bracket and operable to incline a seat back with respect to a seat cushion, and a memory mechanism disposed on the other side of the guide bracket and operable to return the seat back, which has been set at a predetermined angle and subsequently inclined forwardly, to an original position thereof of the predetermined angle. The reclining mechanism includes a first internal gear to be fixed to one of the seat cushion and the seat back, a first cam interposed between the guide bracket and the first internal gear, a pair of first lock gears radially slidable in association with an operation of the first cam, and a first mounting ring for assembling the guide bracket and the first internal gear together with the first cam and the pair of first lock gears interposed therebetween. The first mounting ring has a first flat annular portion and a first cylindrical side portion joined to the guide bracket. On the other hand, the memory mechanism includes a second internal gear to be fixed to the other of the seat cushion and the seat back, a second cam interposed between the guide bracket and the second internal gear, a pair of second lock gears radially slidable in association with an operation of the second cam, and a second mounting ring for assembling the guide bracket and the second internal gear together with the second cam and the pair of second lock gears interposed therebetween. The second mounting ring similarly has a second flat annular portion and a second cylindrical side portion joined to the guide bracket. An outer peripheral surface of the first internal gear is held in sliding contact with an inner surface of the first cylindrical side portion of the first mounting ring to thereby radially position the first internal gear, while an outer peripheral surface of the second internal gear is held in sliding contact with an inner surface of the second cylindrical side portion of the second mounting ring to thereby radially position the second internal gear.

The first and second cylindrical side portions are joined to the guide bracket by laser welding or $CO_2$ welding.

Each of the first and second mounting rings may be made up of a plurality of mounting ring segments, adjacent portions of which are joined to the guide bracket.

The first mounting ring preferably has an edge of a shape complementary to that of an edge of the second mounting ring, and the first and second mounting rings are mated with each other.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein:

FIG. 4A is a sectional view taken along the line IV-IV in FIG. 1;

FIG. 4B is a view similar to FIG. 4A, but depicting a modification thereof;

FIG. 4C is a view similar to FIG. 4A, but depicting another modification thereof;

FIG. 5 is an exploded perspective view of a modification of the recliner adjuster of FIG. 1 and a bracket for mounting it;

DETAILED DESCRIPTION OF THE PREFERRED EMBODIMENTS

This application is based on application Nos. 2004-379630 and 2005-304717 respectively filed Dec. 28, 2004 and Oct. 19, 2005 in Japan, the contents of which are herein expressly incorporated by reference in their entirety.

Figure 1:
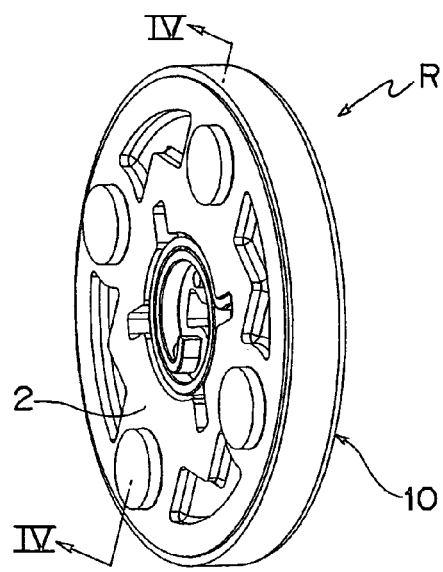
FIG. 1 is a perspective view of a recliner adjuster according to the present invention.
Figure 2A:
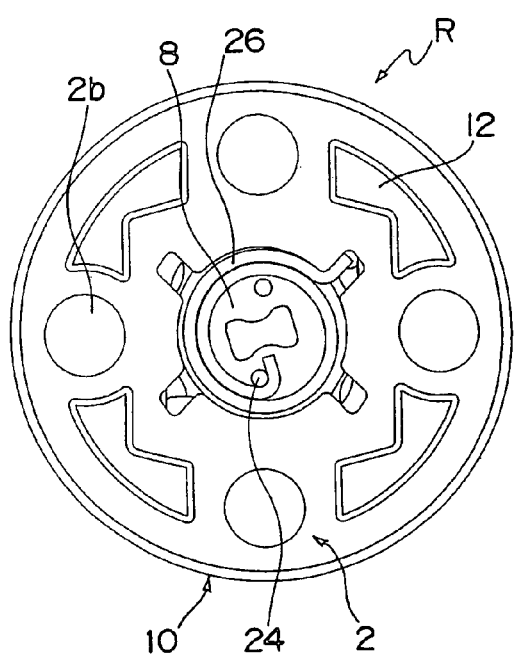
FIG. 2A is a front view of the recliner adjuster of FIG. 1.
Figure 2B:
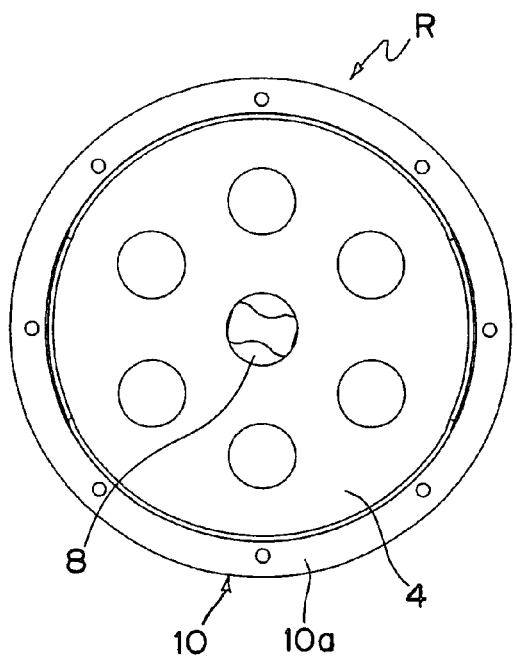
FIG. 2B is a rear view of the recliner adjuster of FIG. 1.
Figure 3:
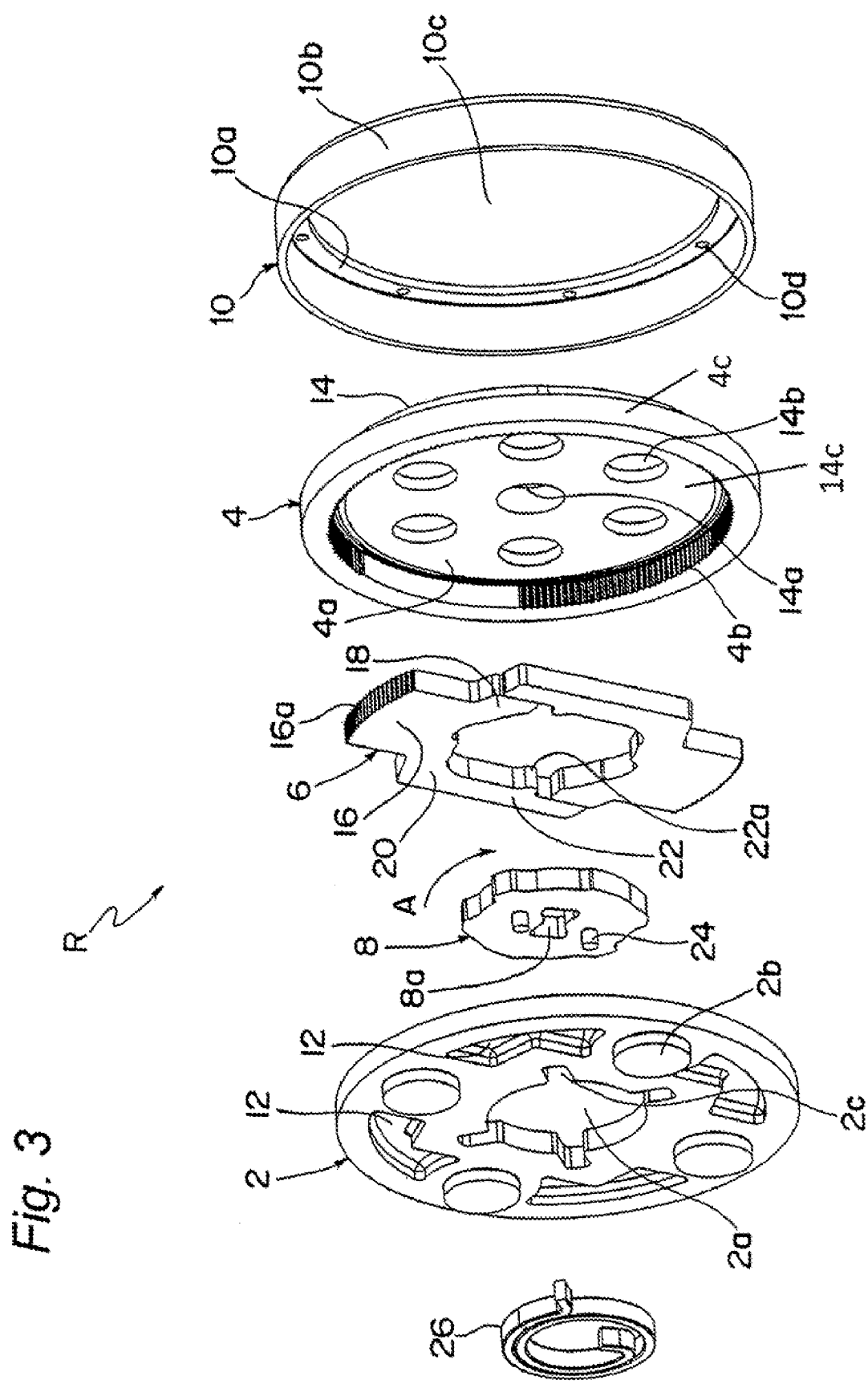
FIG. 3 is an exploded perspective view of the recliner adjuster of FIG. 1.

Referring now to the drawings, there is shown in FIGS. 1 to 3 a recliner adjuster R according to the present invention, which is attached to, for example, each side of an automobile seat. This recliner adjuster R is intended to pivotally hold a seat back (not shown) with respect to a seat cushion (not shown).

The recliner adjuster R includes a guide bracket 2 to be secured to one of the seat cushion and the seat back at a connecting portion between the seat cushion and the seat back, an internal gear 4 to be secured to the other of the seat cushion and the seat back so as to confront the guide bracket 2, a pair of lock gears 6 interposed between the guide bracket 2 and the internal gear 4, and a cam 8 for sliding the pair of lock gears 6 in a direction towards or away from each other. The guide bracket 2 and the internal gear 4 are assembled together by a mounting ring 10 with the lock gears 6 and the cam 8 accommodated therein. The cam 8 is connected to an operating lever (not shown), which is operated to rotate the cam 8 to thereby radially slide the lock gears 6.

The guide bracket 2 is in the form of a generally round plate and has an operating lever insertion hole 2a defined therein at a central portion thereof, into which a portion of the operating lever is inserted for connection to the cam 8. The guide bracket 2 has a pair of upper guide members 12 and a pair of lower guide members 12 formed on an internal surface thereof (a right-side surface in FIG. 3, that is, a surface confronting the internal gear 4) so as to protrude inwardly in the widthwise direction thereof. The guide members 12 are all configured in a point-symmetric fashion with respect to the operating lever insertion hole 2a. The pair of upper guide members 12 have respective side walls confronting one of the lock gears 6 and extending parallel to each other to define a guide groove therebetween, in which a portion of the one of the lock gears 6 is slidably received. The pair of lower guide members 12 similarly have respective side walls confronting the other of the lock gears 6 and extending parallel to each other to define a guide groove therebetween, in which a portion of the other of the lock gears 6 is slidably received. The guide bracket 2 also includes a plurality of equally spaced mounting pins (pin-shaped protrusions) 2b formed around the operating lever insertion hole 2a so as to protrude outwardly in the widthwise direction thereof. These mounting pins 2b are secured to a mounting bracket fixed to the seat cushion or the seat back. The guide members 12 and the mounting pins 2b are all unitarily formed with the guide bracket 2 by pressing predetermined portions of the guide bracket 2.

The internal gear 4 is formed into a generally round shape and has a round protrusion 14 formed on an external surface thereof (a right-side surface in FIG. 3) so as to protrude outwardly in the widthwise direction thereof. The round protrusion 14 has a through-hole 14a defined therein at a central portion thereof so as to confront the operating lever insertion hole 2a in the guide bracket 2, and also has a plurality of equally spaced mounting pins (pin-shaped protrusions) 14b formed around the through-hole 14a so as to protrude outwardly in the widthwise direction thereof. These mounting pins 14b are secured to a mounting bracket fixed to the seat cushion or the seat back. As is the case with the mounting pins 2b, the mounting pins 14b are all unitarily formed with the internal gear 4 by pressing predetermined portions of the internal gear 4. The internal gear 4 further has a recess 4a defined within the round protrusion 14 so as to be defined inside a ring-shaped peripheral portion 4c. The recess 4a has a bottom surface 14c, and the through-hole 14a extends through the bottom surface 14c, as shown in FIG. 3. The recess 4a has a diameter slightly greater than the diameter of outer peripheral surfaces of the pairs of guide members 12 (four in total) referred to above. Internal teeth 4b are formed on an inner peripheral surface of the internal gear 4, i.e., on a side wall of the recess 4a at locations confronting engaging teeth 16a of the lock gears 6. The guide members 12 are all received in the recess 4a with the guide bracket 2 and the internal gear 4 mated with each other so that the outer peripheral surfaces of the guide members 12 may be held in sliding contact with the inner peripheral surface of the internal gear 4.

Each lock gear 6 has an engaging portion 16 vertically slidably received in an associated one of the guide grooves in the guide bracket 2, first and second shoulder portions 18, 20 unitarily formed with the engaging portion 16 on respective sides thereof, and a leg portion 22 extending from the second shoulder portion 20 towards the first shoulder portion 18 of the opposite lock gear 6. The engaging portion 16 has engaging teeth 16a formed on an edge thereof that are engageable with the internal teeth 4b of the internal gear 4. The rotation of one of the guide bracket 2 and the internal gear 4 relative to the other is prevented by the engagement of the engaging teeth 16a with the internal teeth 4b with the guide members 12 received within the recess 4a. The leg portion 22 has a protrusion 22a formed on an inner edge of a distal end portion thereof, which engages with a portion of the cam 8 to radially inwardly slide an associated one of the lock gears 6.

The length of the leg portion 22 is so chosen that the lock gear 6 slidably accommodated within the recess 4a in the internal gear 4 can move between an engaging position, at which upon radially outward movement of the lock gear 6 the engaging teeth 16a formed on the engaging portion 16 engage with the internal teeth 4b of the internal gear 4, and an engagement release position at which upon radially inward movement of the lock gear 6 the engagement between the engaging teeth 16a of the engaging portion 16 and the internal teeth 4b of the internal gear 4 is released. More specifically, the distance between the engaging position and the engagement release position is set to be slightly greater than the tooth depth of the engaging teeth 16a, and upon radially outward movement of the lock gear 6 away from the operating lever insertion hole 2a, the engaging teeth 16a of the engaging portion 16 engage with the internal teeth 4b, while upon radially inward movement of the lock gear 6 towards the operating lever insertion hole 2a, the engagement between the engaging teeth 16a and the internal teeth 4b is released.

The cam 8 is formed into a generally hexagonal shape and has three corners confronting one of the lock gears 6 and the other three corners confronting the other of the lock gears 6. By this construction, when the operating lever is operated, the cam 8 is rotated to appropriately slide the pair of lock gears 6 by way of the six corners thereof.

The cam 8 has an elongated opening 8a defined therein at a central portion thereof, by way of which the cam 8 is connected to the operating lever. The cam 8 also has two pins 24 rigidly secured thereto or otherwise unitarily formed therewith on respective sides of the elongated opening 8a. One of the two pins 24 is connected to one end of a spiral spring 26, the other end of which is in turn received in one of a plurality of equally spaced notches 2c defined in the guide bracket 2 so as to communicate with the operating lever insertion hole 2a, thereby causing the cam 6 to bias the lock gears 6 radially outwardly.

The mounting ring 10 has a flat annular portion 10a and a cylindrical side portion 10b extending from an outer edge of the annular portion 10a in a direction perpendicular to the annular portion 10a. The annular portion 10a has a round hole 10c of a diameter slightly greater than the outer diameter of the round protrusion 14 of the internal gear 4. The cylindrical side portion 10b has a uniform inner diameter substantially equal to the outer diameter of the guide bracket 2 and slightly greater than the outer diameter of the internal gear 4.

In assembling the recliner adjuster R, the mounting ring 10 is externally mounted on the guide bracket 2 and the internal gear 4 from the side of the internal gear 4 with the lock gears 6, the cam 8 and the like interposed between the guide bracket 2 and the internal gear 4 so that the round protrusion 14 of the internal gear 4 may be loosely inserted into the round hole 10c in the mounting ring 10. Under such condition, the mounting ring 10 is rigidly secured to an outer peripheral surface of the guide bracket 2 by laser welding from the direction as indicated by an arrow in FIG. 4A (the direction perpendicular to the cylindrical side portion 10b of the mounting ring 10), thereby completing assemblage of the recliner adjuster R.

When the assemblage of the recliner adjuster R is completed, one of the guide bracket 2 and the internal gear 4 is rotatably held relative to the other by the mounting ring 10, and the outer peripheral surface of the internal gear 4 is held in sliding contact with the inner surface of the cylindrical side portion 10b of the mounting ring 10, while the outer side surface of the internal gear 4 located radially outwardly of the round protrusion 14 is held in sliding contact with the inner surface of the annular portion 10a of the mounting ring 10 and, hence, backlash or looseness of the internal gear 4 in both the radial direction and the widthwise direction is suppressed by the mounting ring 10. That is, the radial positioning and the widthwise positioning of the internal gear 4 are both accomplished by the mounting ring 10.

It is to be noted here that the mounting ring 10 has a plurality of (for example, eight) equally spaced protrusions 10d formed on the inner surface of the annular portion 10a, and the sliding contact between the outer side surface of the internal gear 4 and the inner surface of the annular portion 10a of the mounting ring 10 takes place via the plurality of protrusions 10d. That is, a minimum clearance required for smooth operation of the internal gear 4 is ensured between the outer side surface of the internal gear 4 and the inner surface of the annular portion 10a of the mounting ring 10.

Upon completion of the assemblage of the recliner adjuster R, the mounting pins 14b of the internal gear 4 are each inserted into a pin insertion hole formed in a mounting bracket on the seat cushion side or the seat back side and welded to the mounting bracket, while the mounting pins 2b of the guide bracket 2 are each inserted into a pin insertion hole formed in another mounting bracket on the seat back side or the seat cushion side and welded to such other mounting bracket. By so doing, the recliner adjuster R is held between the two mounting brackets.

Each of the two mounting brackets has an outwardly bent spring retainer unitarily formed therewith. One end of a spiral spring 30 as shown in FIG. 5 is retained by the spring retainer on the seat cushion side, and the other end of the spiral spring 30 is retained by the spring retainer on the seat back side, thereby biasing the seat back in the forward direction at all times.

It is to be noted that the mounting bracket on the seat back side has a connecting shaft insertion hole defined therein in which one end of a connecting shaft (not shown) is inserted for connection to the operating lever, and the other end of the connecting shaft is connected to a cam mounted in the recliner adjuster located on the opposite side of the seat. Accordingly, the left and right recliner adjusters are operated in synchronism with each other by operating the operating lever.

The operation of the recliner adjuster R of the above-described construction is explained hereinafter with reference to FIG. 3.

In a normal sitting condition in which the operating lever is not operated, the cam 8 is biased in a direction indicated by an arrow A by the action of an elastic force of the spiral spring 26.

In this condition, two corners of the cam 8 are held in contact with an inner peripheral surface of one of the lock gears 6 to bias it radially outwardly, thereby engaging the engaging teeth 16a of the lock gear 6 with the internal teeth 4b of the internal gear 4, while the other two corners of the cam 8 opposite to such two corners are similarly held in contact with an inner peripheral surface of the other of the lock gears 6 to bias it radially outwardly, thereby engaging the engaging teeth 16a of the lock gear 6 with the internal teeth 4b of the internal gear 4. Accordingly, the position of the internal gear 4 relative to the guide bracket 2 or the inclination of the seat back relative to the seat cushion is held at a predetermined position or a predetermined angle.

When the operating lever is operated against the elastic force of the spiral spring 26, the cam 8 is rotated in a direction counter to the direction of the arrow A to release each of the lock gears 6 from the pressing action by the two corners of the cam 8. At this moment, another corner of the cam 8 is brought into contact with and presses the protrusion 22a of the leg portion 22 of an associated one of the lock gears 6 and, hence, the engaging portions 16 of the lock gears 6 slide radially inwardly along the corresponding guide grooves, thereby releasing the engagement of the engaging teeth 16a with the internal teeth 4b of the internal gear 4. As a result, the lock gears 6 move from the engaging position to the engagement release position, making it possible to appropriately adjust the posture (inclination) of the seat back relative to the seat cushion.

After the posture of the seat back relative to the seat cushion has been set as desired, when the operating lever is released, the cam 8 is rotated in the direction of the arrow A by the action of the elastic force of the spiral spring 26 to slide the lock gears 6 radially outwardly. As a result, the engaging teeth 16a of the lock gears 6 engage with the internal teeth 4b of the internal gear 4 again, thus holding the seat back in the newly set posture.

Modification 1.

FIG. 5 depicts a modification R1 of the recliner adjuster according to the present invention, which includes a mounting ring 10A having a seat back side spring retainer 10e unitarily formed with the flat annular portion 10a so as to extend towards a seat cushion side mounting bracket 28.

More specifically, in the recliner adjuster R1 as shown in FIG. 5, the mounting pins 14b of the internal gear 4 are inserted into corresponding pin insertion holes 28a defined in the mounting bracket 28, while the mounting pins 2b of the guide bracket 2 are inserted into corresponding pin insertion holes (not shown) defined in a seat back side mounting bracket. One end of the spiral spring 30 is retained by a spring retainer 28b unitarily formed with the seat cushion side mounting bracket 28, while the other end of the spiral spring 30 is retained by the spring retainer 10e of the mounting ring 10A, thereby biasing the seat back in the forward direction at all times.

In this case, because the spring retainer 10e is positioned between front and rear upper edges 28c of the seat cushion side mounting bracket 28, a movable range of the spring retainer 10e is restricted by the two upper edges 28c of the seat cushion side mounting bracket 28. That is, the spring retainer 10e serves as a rotating range restricting member for restricting the rotating range of the guide bracket 2 with respect to the internal gear 4.

Figure 6:
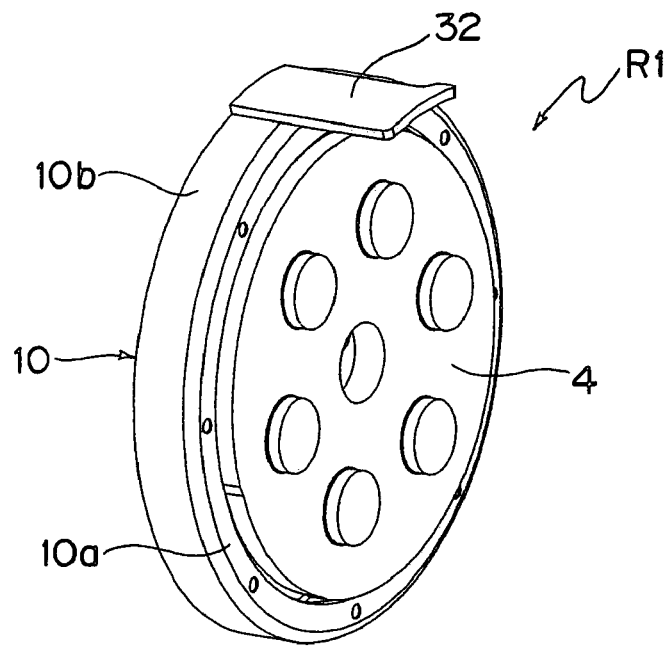
FIG. 6 is a perspective view of another modification of the recliner adjuster of FIG. 1.

It is to be noted here that although in the recliner adjuster R1 of FIG. 5 the spring retainer 10e has been described and depicted as being unitarily formed with the mounting ring 10A, a spring retainer 32 separate from the mounting ring 10 may be rigidly secured to the cylindrical side portion 10b of the mounting ring 10, as shown in FIG. 6.

Modification 2.

Figure 7:
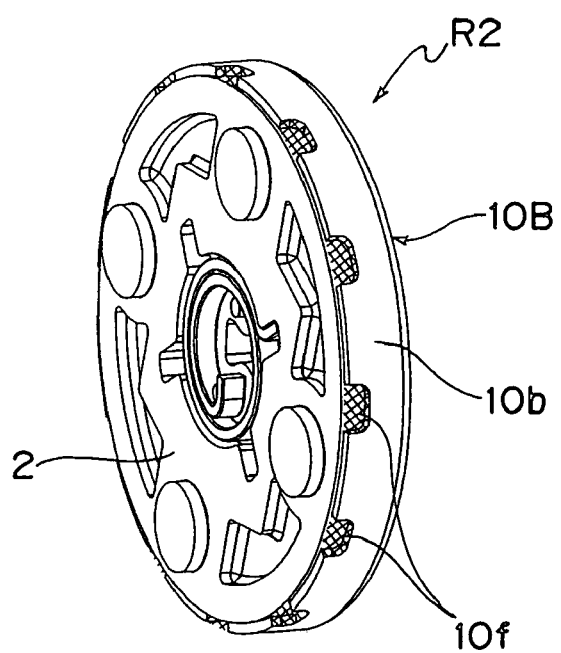
FIG. 7 is a perspective view of a further modification of the recliner adjuster of FIG. 1.
Figure 8:
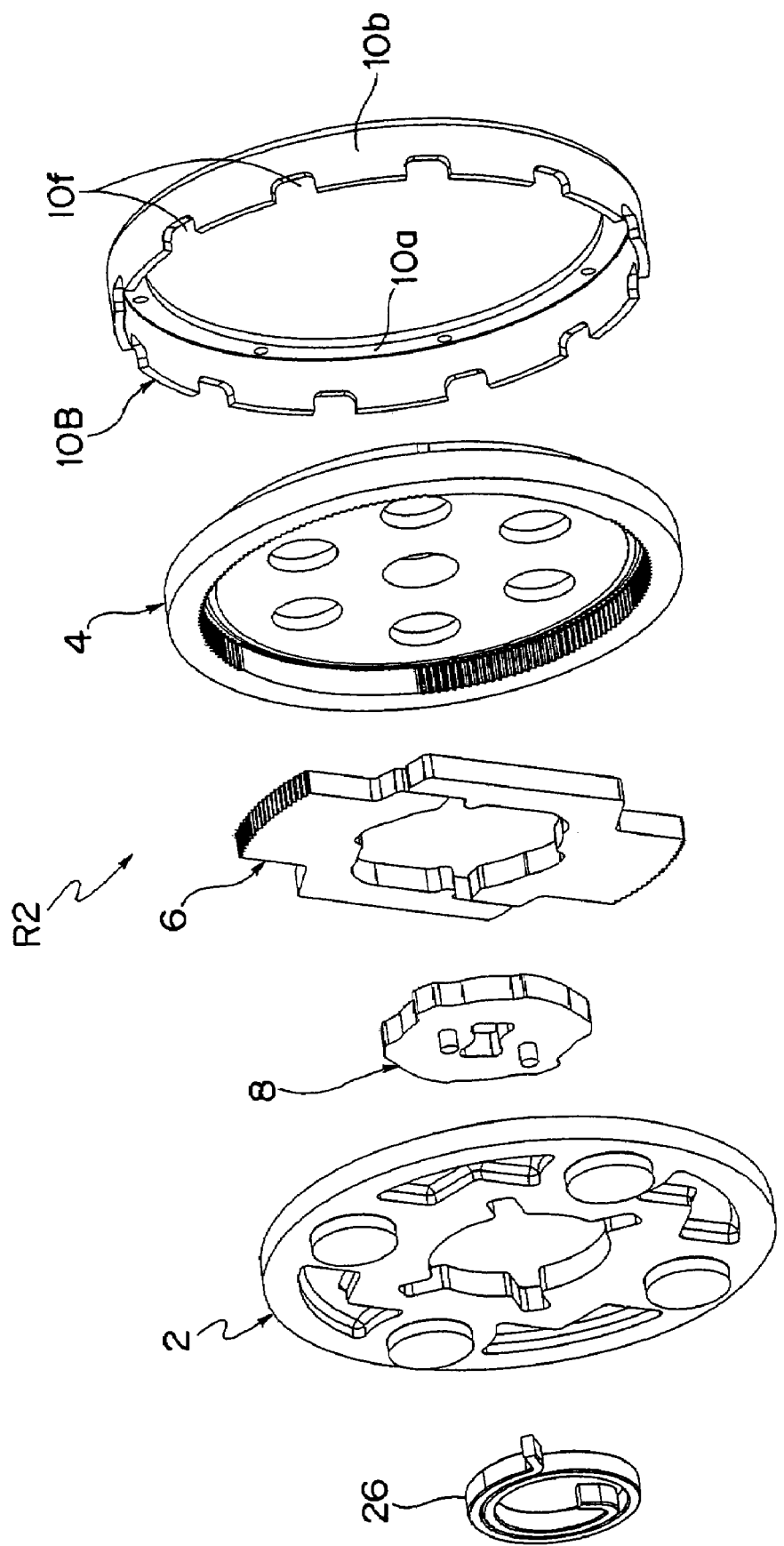
FIG. 8 is an exploded perspective view of the recliner adjuster of FIG. 7.

FIGS. 7 and 8 depict another modification R2 of the recliner adjuster according to the present invention, which includes a mounting ring 10B having a plurality of equally spaced notches 10f defined in an edge portion of a cylindrical side portion 10b thereof. The mounting ring 10B is joined to an outer peripheral surface of a guide bracket 2 via the plurality of notches 10f by $CO_2$ welding. Because the other constructions of this modification R2 are the same as those of the recliner adjuster R as shown in FIGS. 1 to 3, explanation thereof is omitted.

In this modification R2, the spring retainer 10e or 32 explained in the modification R1 referred to above may be also unitarily formed with or rigidly secured to the mounting ring 10B.

Modification 3.

Figure 9:
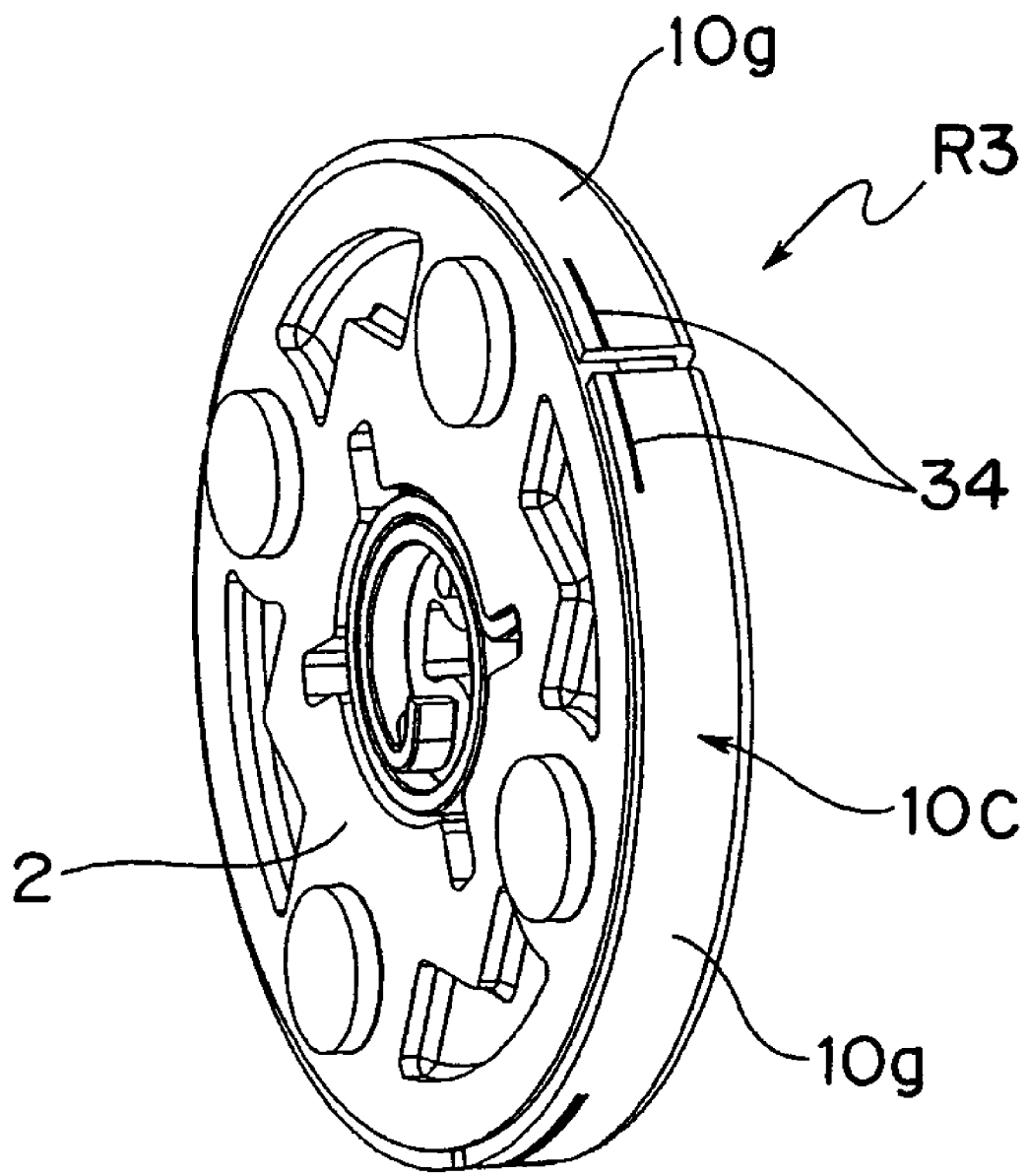
FIG. 9 is a perspective view of a still further modification of the recliner adjuster of FIG. 1.
Figure 10:
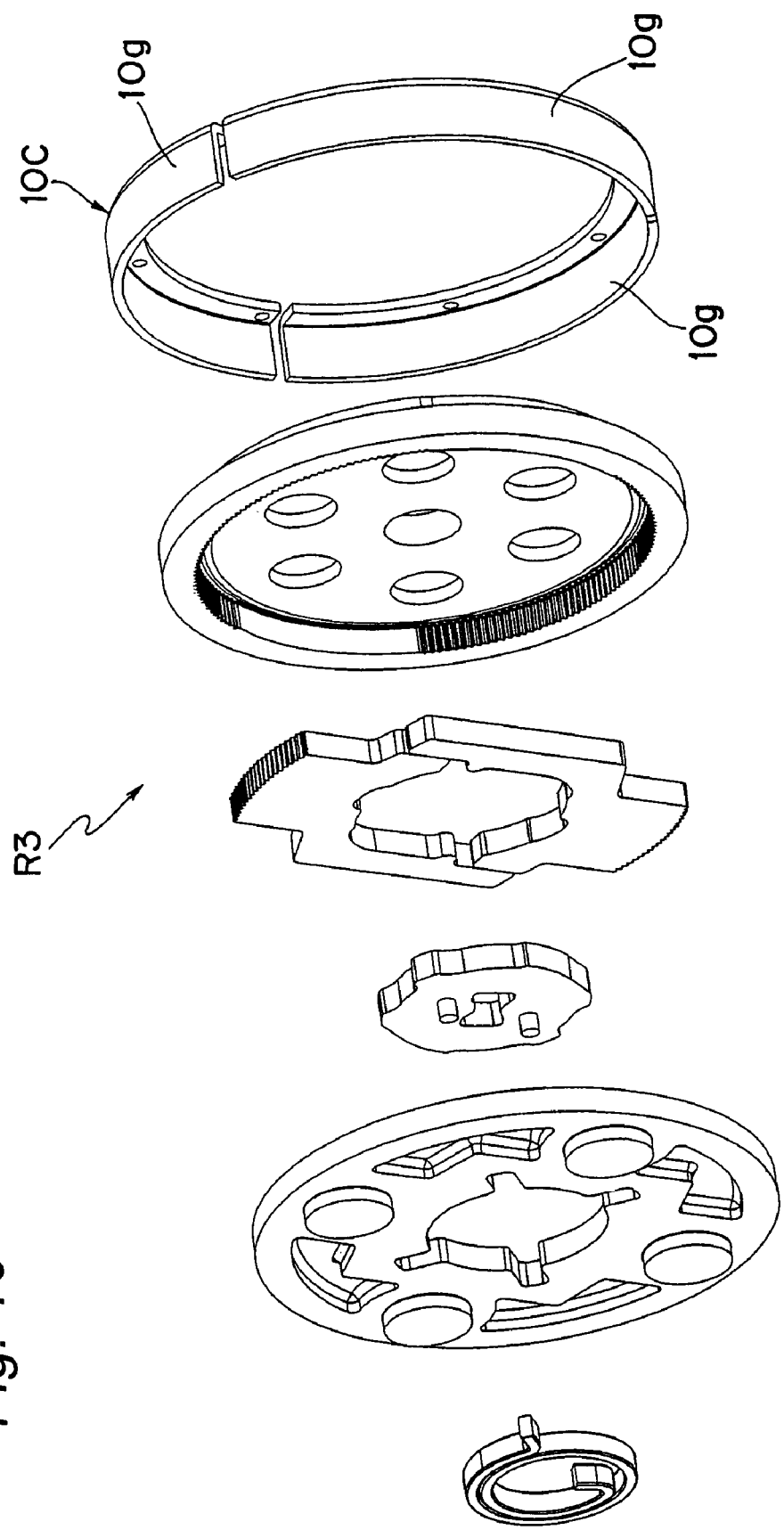
FIG. 10 is an exploded perspective view of the recliner adjuster of FIG. 9.

FIGS. 9 and 10 depict a further modification R3 of the recliner adjuster according to the present invention, which includes a mounting ring 10C made up of three equally divided mounting ring segments 10g. The three mounting ring segments 10g are first positioned at regular intervals around the guide bracket 2 and the internal gear 4 and subsequently joined at their adjacent portions 34 along their edges to an outer peripheral surface of the guide bracket 2 by laser welding, as shown in FIG. 9.

It is to be noted here that although in this modification R3 the mounting ring 10C has been described and depicted as being divided into three, it may be divided into two or more than four.

In this modification R3 also, the mounting ring 10C may be provided with the spring retainer 10e or 32 referred to above.

It is also to be noted that although in the above-described embodiment the mounting ring has been described as being joined to the guide bracket 2 by laser welding or $CO_2$ welding, the mounting ring may be joined to the internal gear 4, as shown in FIG. 4B. In this case, the inner diameter of the cylindrical side portion 10b is so determined as to be substantially the same as the outer diameter of the internal gear 4 and slightly greater than the outer diameter of the guide bracket 2.

More specifically, in assembling the recliner adjuster R1, the mounting ring 10 is externally mounted on the guide bracket 2 and the internal gear 4 from the side of the guide bracket 2 with the lock gears 6, the cam 8 and the like interposed between the guide bracket 2 and the internal gear 4 so that the mounting pins 2b of the guide bracket 2 may be inserted into the round hole 10c in the mounting ring 10. Under such condition, the mounting ring 10 is rigidly secured to an outer peripheral surface of the internal gear 4 by laser welding or $CO_2$ welding from the direction as indicated by an arrow in FIG. 4B (the direction perpendicular to the cylindrical side portion 10b of the mounting ring 10), thereby completing assemblage of the recliner adjuster R1.

When the assemblage of the recliner adjuster R1 is completed, one of the guide bracket 2 and the internal gear 4 is rotatably held relative to the other by the mounting ring 10, and the outer peripheral surface of the guide bracket 2 is held in sliding contact with the inner surface of the cylindrical side portion 10b of the mounting ring 10, while the outer side surface of the guide bracket 2 located radially outwardly of the mounting pins 2b is held in sliding contact with the plurality of protrusions 10d formed on the annular portion 10a of the mounting ring 10 and, hence, backlash or looseness of the guide bracket 2 in both the radial direction and the widthwise direction is suppressed by the mounting ring 10. That is, the radial positioning and the widthwise positioning of the guide bracket 2 are both accomplished by the mounting ring 10.

It is to be noted here that although in the example as shown in FIG. 4A or 4B the mounting ring 10 is joined to the guide bracket 2 or the internal gear 4 by laser welding or $CO_2$ welding performed radially inwardly, a mounting ring 10D can be joined to a guide bracket 2A by laser welding performed in the axial direction, as shown in FIG. 4C.

More specifically, in the construction shown in FIG. 4C, the guide bracket 2A has a round recess 2d defined therein in which an internal gear 4A is received, and under the condition in which an inner side surface of an outer peripheral portion of the mounting ring 10D is held in contact with an inner side surface of the guide bracket 2A located radially outwardly of the round recess 2d, both of them are joined together by laser welding from a direction perpendicular to the contact surface between the guide bracket 2A and the mounting ring 10D.

In this case, when the assemblage of the recliner adjuster R4 is completed, the internal gear 4A is rotatably held by the guide bracket 2A and the mounting ring 10D, and an inner peripheral surface or side wall of the recess 2d in the guide bracket 2A is held in sliding contact with an outer peripheral surface of the internal gear 4A, while an outer side surface of the internal gear 4A adjacent such sliding contact surface is held in sliding contact with the plurality of protrusions 10d formed on the mounting ring 10D. Accordingly, radial backlash or looseness of the internal gear 4A is suppressed by the guide bracket 2A, while widthwise backlash or looseness of the internal gear 4A is suppressed by the mounting ring 10D. That is, the radial positioning and the widthwise positioning of the internal gear 4A are accomplished by the guide bracket 2A and the mounting ring 10D, respectively.

Figure 11:
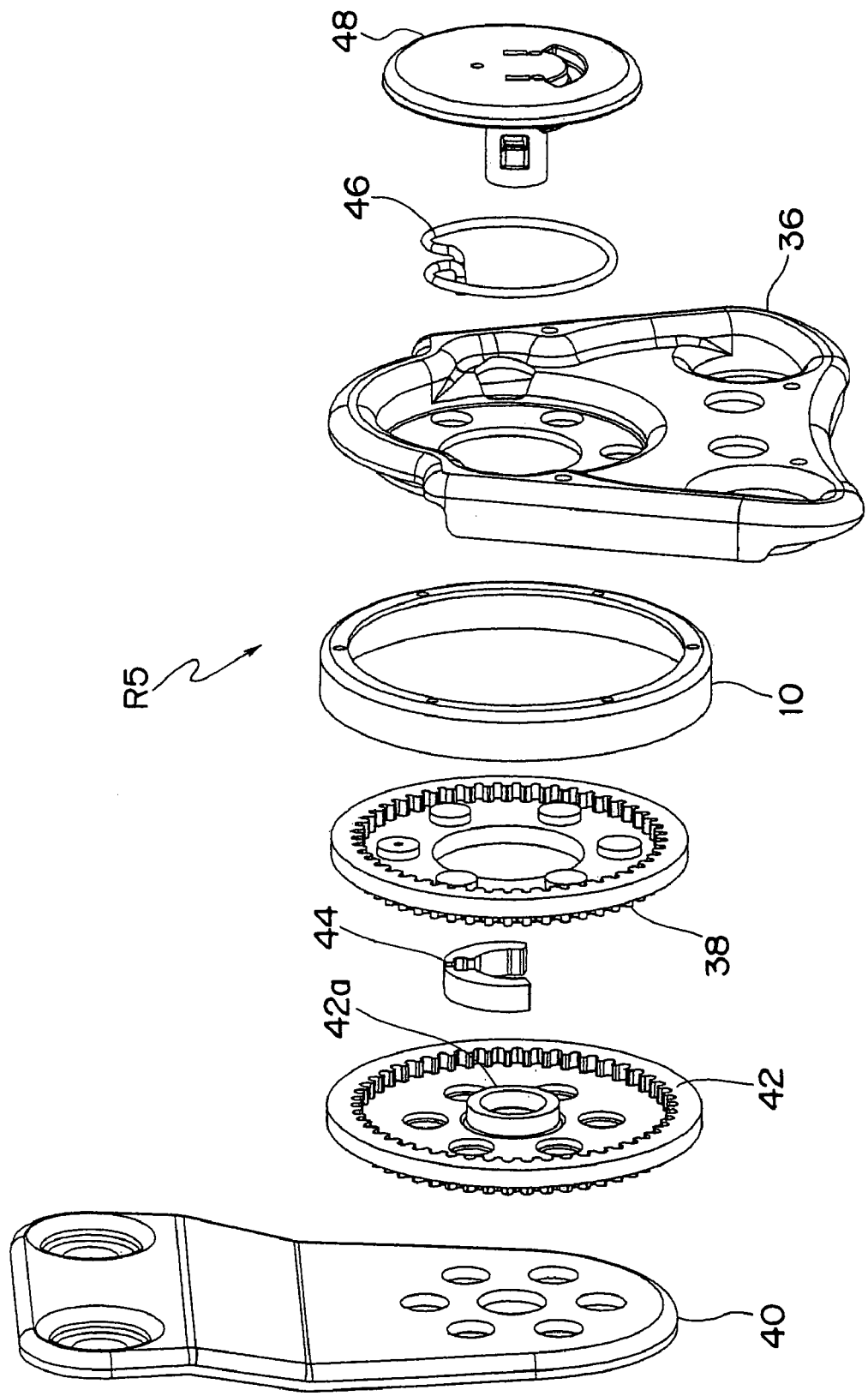
FIG. 11 is an exploded perspective view of another modification of the recliner adjuster of FIG. 1.

The shapes and the joining methods of the mounting rings explained in the embodiment and several modifications referred to above can be equally applied to a recliner adjuster R5 called "Taumel recliner" as shown in FIG. 11.

The recliner adjuster R5 as shown in FIG. 11 includes an external gear 38 to be attached to a seat cushion side mounting bracket 36 and an internal gear 42 to be attached to a seat back side mounting bracket 40 and held in engagement with the external gear 38. The internal gear 42 has a cylindrical portion 42a formed therewith at a central portion thereof so as to protrude towards the external gear 38. The recliner adjuster R5 also includes a pair of wedge-shaped members 44, disposed movable around the cylindrical portion 42a, for holding engagement between external teeth of the external gear 38 and internal teeth of the internal gear 42. The wedge-shaped members 44 are biased by a spring 46 in a direction in which the external teeth of the external gear 38 and the internal teeth of the internal teeth 42 engage with each other. A drive member 48 is provided to rotate the external gear 38 in an eccentric fashion with respect to the internal gear 42. The number of the internal teeth of the internal gear 42 is so determined as to be slightly greater than that of the external teeth of the external gear 38.

Figure 12:
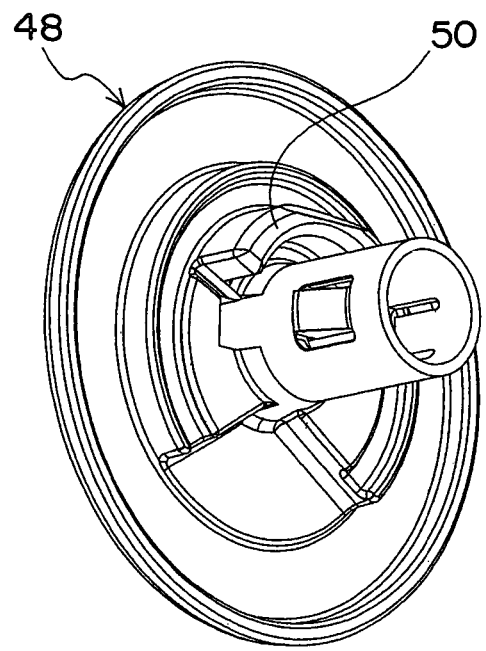
FIG. 12 is a perspective view of a drive member mounted in the recliner adjuster of FIG. 11.

As shown in FIG. 12, the drive member 48 has a cam 50 formed by cutting a portion of a cylindrical member unitarily formed therewith.

When the recliner adjuster R5 of the above-described construction is in a normal sitting condition, the pair of wedge-shaped members 44 are spread out by the spring 46 to press the external teeth of the external gear 38 against the internal teeth of the internal gear 42, thereby holding engagement between the external teeth of the external gear 38 and the internal teeth of the internal gear 42.

Under such condition, when the drive member 48 is rotated, one of the pair of wedge-shaped members 44 is moved towards the other by the cam 50 against an elastic force of the spring 46, followed by a reduction of the gap therebetween. As a result, the eccentricity of the external gear 38 with respect to the internal gear 42 reduces, and when the drive member 48 is further rotated, the pair of wedge-shaped members 44 rotate together with the drive member 48, and the position where the external teeth of the external gear 38 and the internal teeth of the internal gear 42 engage with each other rotates, making it possible to gradually change the inclination of the seat back relative to the seat cushion.

Because the recliner adjuster R5 of the above-described construction is known, explanation of other constructions and operations thereof is omitted.

In this recliner adjuster R5, after the external gear 38 has been inserted into the mounting ring 10, and the wedge-shaped members 44 and the spring 46 have been appropriately positioned between the internal gear 42 and the external gear 38, the mounting ring 10 is joined to an outer peripheral surface of the internal gear 42 by laser welding.

The mounting ring 10 can be joined to an outer peripheral surface of the external gear 38 by laser welding.

A different construction is also possible in which the external gear 38 is secured to the seat back side mounting bracket 40, while the internal gear 42 held in engagement with the external gear 38 is secured to the seat cushion side mounting bracket 36.

Figure 13:
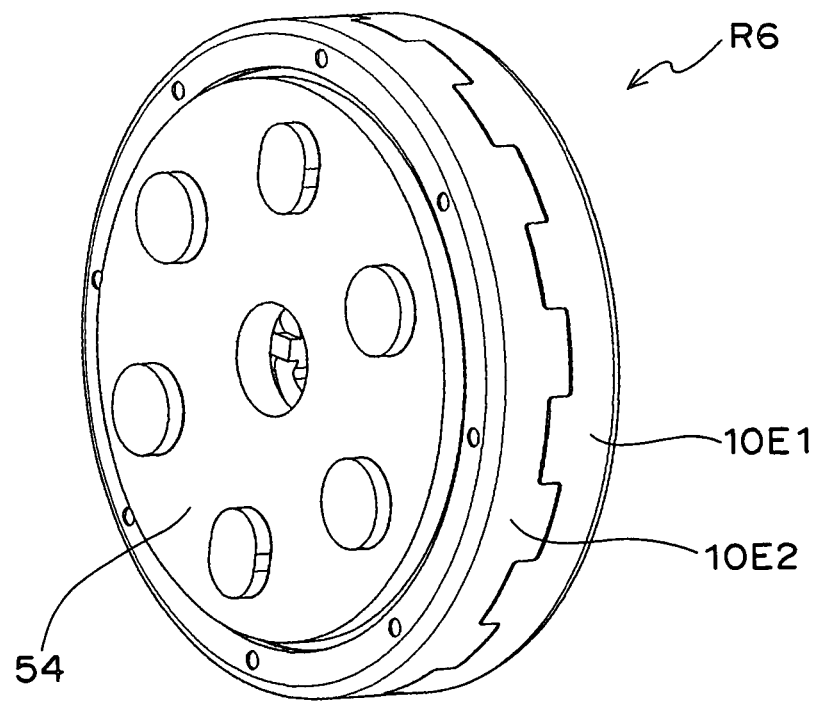
FIG. 13 is a perspective view of a further modification of the recliner adjuster of FIG. 1.
Figure 14:
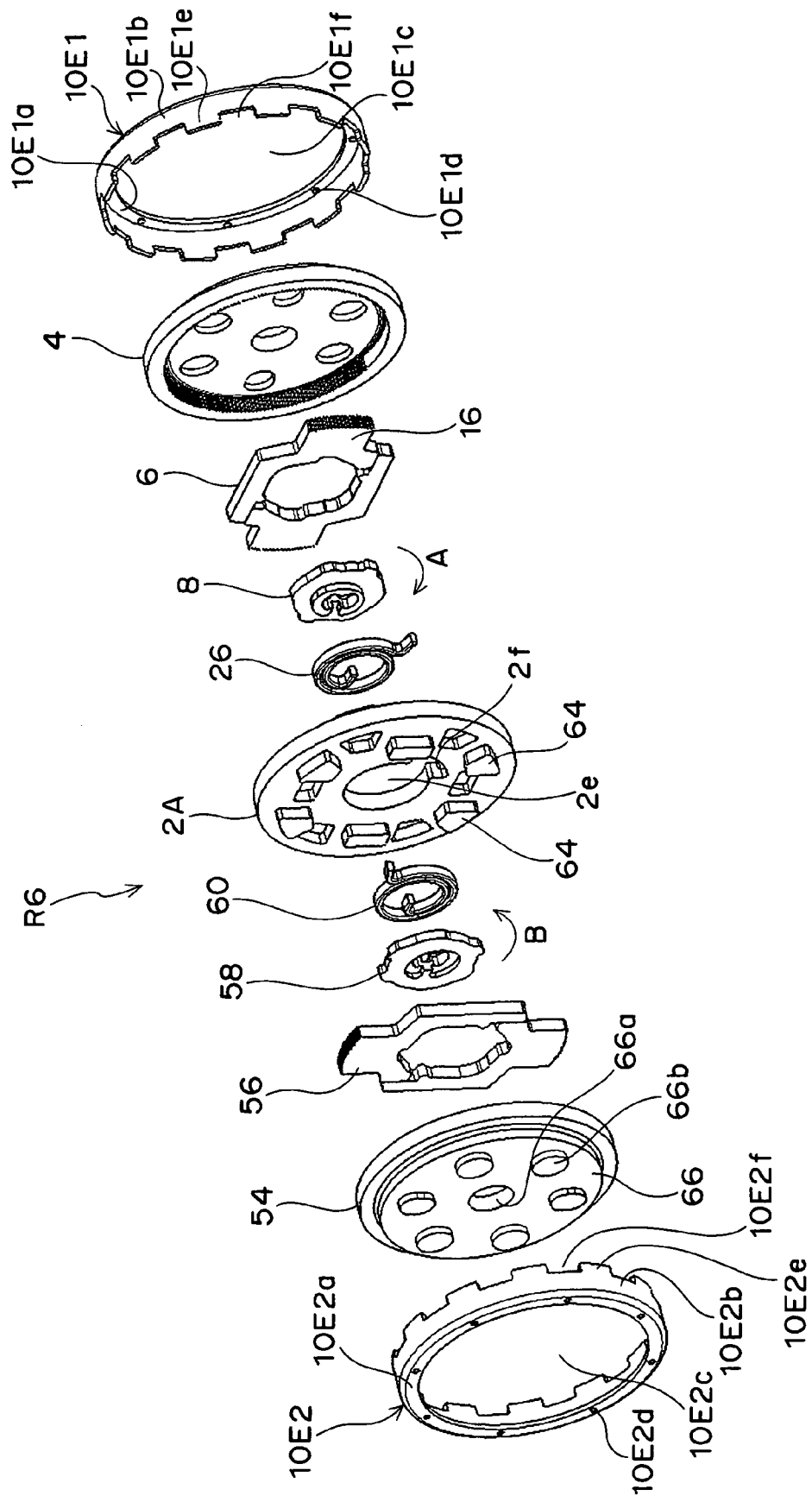
FIG. 14 is an exploded perspective view of the recliner adjuster of FIG. 13.
Figure 15:
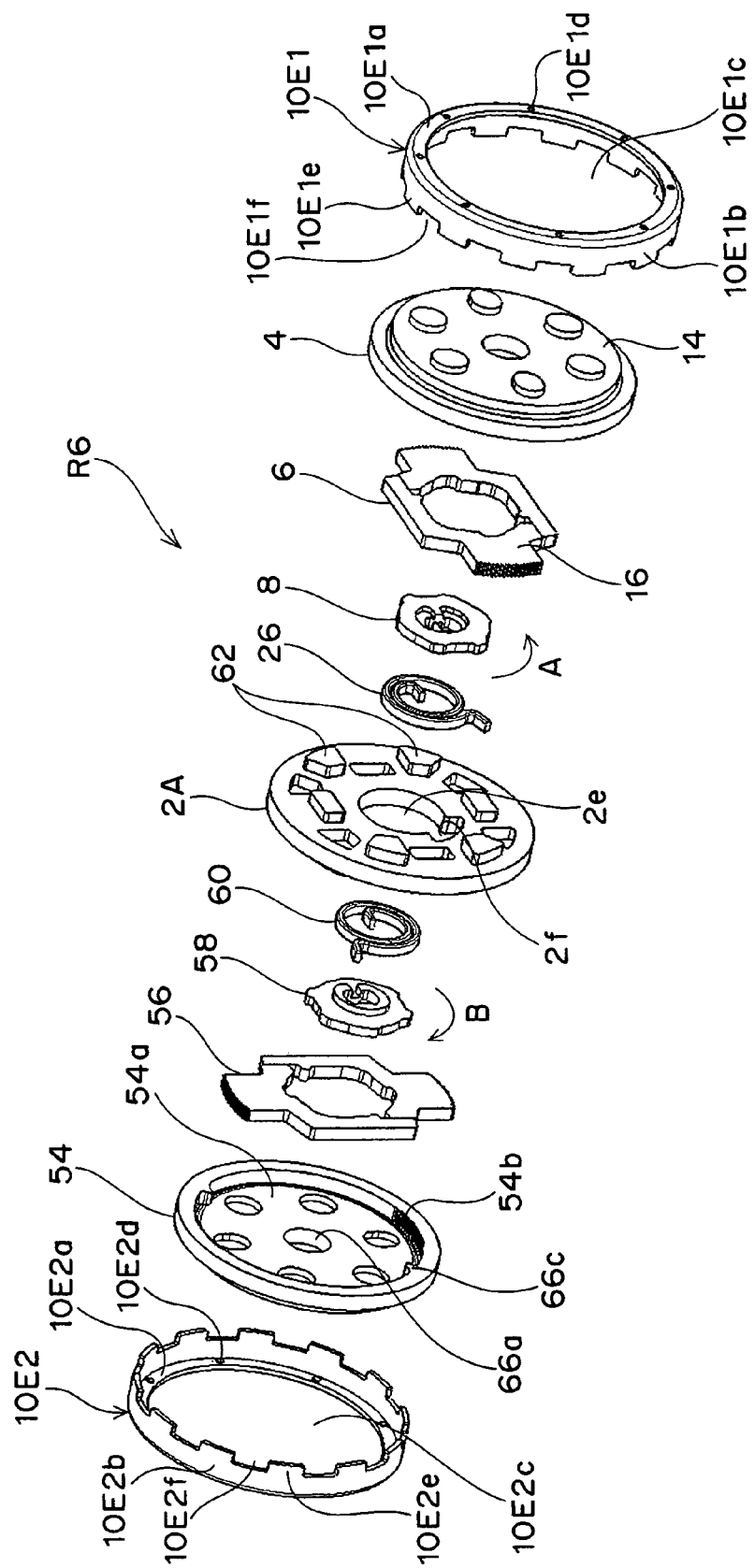
FIG. 15 is another exploded perspective view of the recliner adjuster of FIG. 13.

The shapes and the joining methods of the mounting rings explained in the embodiment and several modifications referred to above can be equally applied to a recliner adjuster R6 having a memory mechanism as shown in FIGS. 13 to 15.

As shown in FIGS. 14 and 15, the recliner adjuster R6 includes a reclining mechanism disposed on one side of a guide bracket (intermediate plate) 2A and a memory mechanism disposed on the other side of the guide bracket 2A. The reclining mechanism includes a first internal gear 4, a pair of first lock gears 6, a first cam 8, and a first spiral spring 26, while the memory mechanism includes a second internal gear 54, a pair of second lock gears 56, a second cam 58, and a second spiral spring 60. The reclining mechanism and the memory mechanism are assembled together by joining a first mounting ring 10E1, mounted externally on the reclining mechanism, to the guide bracket 2A and by joining a second mounting ring 10E2, mounted externally on the memory mechanism, to the guide bracket 2A.

The guide bracket 2A is in the form of a generally round plate and has a spring insertion hole 2e defined therein at a central portion thereof, into which the first and second spiral springs 26, 60 are inserted. A notch 2f is formed in the guide bracket 2A at an edge portion of the spring insertion hole 2e, and outer ends of the first and second spiral springs 26, 60 are received within the notch 2f. The guide bracket 2A has two pairs of first guide members 62 formed on a surface thereof on respective sides of the spring insertion hole 2e so as to protrude towards the reclining mechanism. The first guide members 62 are all configured in a point-symmetric fashion with respect to the spring insertion hole 2e. Each pair of first guide members 62 have respective side walls confronting one of the first lock gears 6 and extending parallel to each other to define a guide groove therebetween, in which a portion of the one of the first lock gears 6 is slidably received.

The guide bracket 2A also has two pairs of second guide members 64 formed on the other surface thereof on respective sides of the spring insertion hole 2e so as to protrude towards the memory mechanism. The second guide members 64 are all configured in a point-symmetric fashion with respect to the spring insertion hole 2e. Each pair of second guide members 64 have respective side walls confronting one of the second lock gears 56 and extending parallel to each other to define a guide groove therebetween, in which a portion of the one of the second lock gears 56 is slidably received.

Although the construction of the reclining mechanism and that of the memory mechanism have been briefly explained hereinabove, the construction of the reclining mechanism is substantially the same as that of the reclining adjuster R shown in FIG. 3 and, hence, further explanation thereof is omitted. Also, the construction of the memory mechanism is basically the same as that of the recliner adjuster R shown in FIG. 3, but the construction of the second internal gear 54 differs and is therefore further explained hereinafter.

The second internal gear 54 is formed into a generally round shape and has a round protrusion 66 formed on an external surface thereof so as to protrude outwardly in the widthwise direction thereof. The round protrusion 66 has a through-hole 66a defined therein at a central portion thereof and a plurality of equally spaced mounting pins (pin-shaped protrusions) 66b formed around the through-hole 66a so as to protrude outwardly in the widthwise direction thereof. These mounting pins 66b are secured to a mounting bracket fixed to the seat cushion or the seat back.

The second internal gear 54 also has a recess 54a defined within the round protrusion 66. The recess 54a has a diameter slightly greater than the diameter of outer peripheral surfaces of the two pairs of second guide members 64 referred to above. Two series of internal teeth 54b are formed on an inner peripheral surface of the second internal gear 54, i.e., on a side wall of the recess 54a at locations confronting engaging teeth of the second lock gears 56 over a range substantially equal to the range in which the engaging teeth of the second lock gears 56 are formed. Furthermore, a radially inwardly protruding protrusion 66c is formed on one side of each series of internal teeth 54b. This protrusion 66c serves as a stopper that is brought into contact with one of the paired second guide members 64 to prevent rearward inclination of the seat back. The second guide members 64 are all received in the recess 54a with the guide bracket 2A and the second internal gear 54 mated with each other so that the outer peripheral surfaces of the second guide members 64 may be held in sliding contact with the inner peripheral surface of the second internal gear 54.

Similar to the mounting ring 10 as shown in FIG. 3, the first mounting ring 10E1 has a flat annular portion 10E1a and a cylindrical side portion 10E1b extending from an outer edge of the annular portion 10E1a in a direction perpendicular to the annular portion 10E1a. The annular portion 10E1a has a round hole 10E1c of a diameter slightly greater than the outer diameter of the round protrusion 14 of the first internal gear 4. The cylindrical side portion 10E1b has an inner diameter substantially equal to the outer diameter of the guide bracket 2A and slightly greater than the outer diameter of the first internal gear 4. The first mounting ring 10E1 differs from the mounting ring 10 as shown in FIG. 3 in that the cylindrical side portion 10E1b of the former has a plurality of equally spaced rectangular projections 10E1e formed on an edge thereof with a rectangular recess 10e1f of a width equal to that of the rectangular projections 10E1e formed between adjacent rectangular projections 10E1e. A plurality of (for example, eight) equally spaced protrusions 10E1d are formed on an inner surface of the annular portion 10E1a of the first mounting ring 10E1.

Because the shape of the second mounting ring 10E2 is the same as that of the first mounting ring 10E1, explanation thereof is omitted.

In assembling the recliner adjuster R6, the first mounting ring 10E1 is externally mounted on the guide bracket 2A and the first internal gear 4 from the side of the first internal gear 4 with the first lock gears 6, the first cam 8 and the like interposed between the guide bracket 2A and the first internal gear 4 so that the round protrusion 14 of the first internal gear 4 may be loosely inserted into the round hole 10E1c in the first mounting ring 10E1. The second mounting ring 10E2 is similarly externally mounted on the guide bracket 2A and the second internal gear 54 from the side of the second internal gear 54 with the second lock gears 56, the second cam 58 and the like interposed between the guide bracket 2A and the second internal gear 54 so that the round protrusion 66 of the second internal gear 54 may be loosely inserted into the round hole 10E2c in the second mounting ring 10E2. Because the rectangular projections 10E1e, 10E2e and the rectangular recesses 10E1f, 10E2f of the same width are alternately formed on respective edges of the first and second mounting rings 10E1, 10E2, the first and second mounting rings 10E1, 10E2 are mated with each other such that the rectangular projections 10E1e of the first mounting ring 10E1 are received within the rectangular recesses 10E2f of the second mounting ring 10E2. That is, the first and second mounting rings 10E1, 10E2 are positioned to represent complementary shapes when mated.

Under such condition, the first and second mounting rings 10E1, 10E2 are both rigidly secured to an outer peripheral surface of the guide bracket 2A by laser welding from the direction perpendicular to the cylindrical side portions 10E1b, 10E2b, thereby completing assemblage of the recliner adjuster R6.

It is to be noted here that if the first and second mounting rings 10E1, 10E2 are configured as shown in FIG. 7 or 8, they can be joined to the outer peripheral surface of the guide bracket 2A by $CO_2$ welding.

When the assemblage of the recliner adjuster R6 is completed, one of the guide bracket 2A and the first internal gear 4 is rotatably held relative to the other by the first mounting ring 10E1, and the outer peripheral surface of the first internal gear 4 is held in sliding contact with the inner surface of the cylindrical side portion 10E1b of the first mounting ring 10E1, while the outer side surface of the first internal gear 4 located radially outwardly of the round protrusion 14 is held in sliding contact with the inner surface of the annular portion 10E1a of the first mounting ring 10E1 and, hence, backlash or looseness of the first internal gear 4 in both the radial direction and the widthwise direction is suppressed by the first mounting ring 10E1. That is, the radial positioning and the widthwise positioning of the first internal gear 4 are both accomplished by the first mounting ring 10E1. Because a plurality of protrusions 10E1d are formed on the inner surface of the annular portion 10E1a of the first mounting ring 10E1 at regular intervals as explained hereinabove, the sliding contact between the outer side surface of the first internal gear 4 and the inner surface of the annular portion 10E1a of the first mounting ring 10E1 takes place via the plurality of protrusions 10E1d. That is, a minimum clearance required for smooth operation of the first internal gear 4 is ensured between the outer side surface of the first internal gear 4 and the inner surface of the annular portion 10E1a of the first mounting ring 10E1.

Similarly, one of the guide bracket 2A and the second internal gear 54 is rotatably held relative to the other by the second mounting ring 10E2, and the outer peripheral surface of the second internal gear 54 is held in sliding contact with the inner surface of the cylindrical side portion 10E2b of the second mounting ring 10E2, while the outer side surface of the second internal gear 54 located radially outwardly of the round protrusion 66 is held in sliding contact with the inner surface of the annular portion 10E2a of the second mounting ring 10E2 and, hence, backlash or looseness of the second internal gear 54 in both the radial direction and the widthwise direction is suppressed by the second mounting ring 10E2. That is, the radial positioning and the widthwise positioning of the second internal gear 54 are both accomplished by the second mounting ring 10E2. Because a plurality of protrusions 10E2d are formed on the inner surface of the annular portion 10E2a of the second mounting ring 10E2 at regular intervals, the sliding contact between the outer side surface of the second internal gear 54 and the inner surface of the annular portion 10E2a of the second mounting ring 10E2 takes place via the plurality of protrusions 10E2d. That is, a minimum clearance required for smooth operation of the second internal gear 54 is ensured between the outer side surface of the second internal gear 54 and the inner surface of the annular portion 10E2a of the second mounting ring 10E2.

Upon completion of the assemblage of the recliner adjuster R6, the mounting pins 66b of the second internal gear 54 are each inserted into a pin insertion hole formed in a seat cushion side mounting bracket and welded to the mounting bracket, while the mounting pins 14b of the first internal gear 4 are each inserted into a pin insertion hole formed in a seat back side mounting bracket and welded to the mounting bracket. By so doing, the recliner adjuster R6 is held between the two mounting brackets.

It is to be noted that if the radially inwardly protruding protrusion 66c is formed on the other side of each series of internal teeth 54b of the second internal gear 54, the first internal gear 4 can be mounted on the seat cushion side, while the second internal gear 54 can be mounted on the seat back side.

It is also to be noted that the first cams 8 of the left and right recliner adjusters are operated in synchronism with each other by way of a first connecting shaft, while the second cams 58 of the left and right recliner adjusters are operated in synchronism with each other by way of a second connecting shaft.

In the recliner adjuster R6 of the above-described construction, the operation of the reclining mechanism is the same as that of the recliner adjuster R as shown in FIG. 3 and, hence, explanation thereof is omitted. The operation of the memory mechanism is explained hereinafter.

The second cam 58 is connected to a second operating lever extending through the through-hole 66a in the second internal gear 54, and in a normal sitting condition in which the second operating lever is not operated, the second cam 58 is biased in a direction indicated by an arrow B by the action of an elastic force of the second spiral spring 60.

In this condition, two corners of the second cam 58 are held in contact with an inner peripheral surface of one of the second lock gears 56 to bias it radially outwardly, thereby engaging the engaging teeth of the second lock gear 56 with a series of internal teeth 54b of the second internal gear 54, while the other two corners of the second cam 58 opposite to such two corners are similarly held in contact with an inner peripheral surface of the other of the second lock gears 56 to bias it radially outwardly, thereby engaging the engaging teeth of the second lock gear 56 with another series of internal teeth 54b of the second internal gear 54. Accordingly, the position of the second internal gear 54 relative to the guide bracket 2A or the inclination of the seat back relative to the seat cushion is held at a predetermined position or a predetermined angle.

When the second operating lever is operated against the elastic force of the second spiral spring 60, the second cam 58 is rotated in a direction counter to the direction of the arrow B to release each of the second lock gears 56 from the pressing action by the two corners of the second cam 58. At this moment, another corner of the second cam 58 is brought into contact with and presses a protrusion of the leg portion of an associated one of the second lock gears 56 and, hence, the engaging portions of the second lock gears 56 slide radially inwardly along the corresponding guide grooves, thereby releasing the engagement of the engaging teeth of the second lock gears 56 with the internal teeth 54b of the second internal gear 54. As a result, the second lock gears 56 move from the engaging position to the engagement release position, making it possible to incline the seat back forwardly.

Because each series of internal teeth 54b of the second internal gear 54 are formed in a narrower region than the internal teeth 4b of the first internal gear 4, even if the second operating lever is released during forward inclination of the seat back, the seat back easily reaches its foremost position.

After the forward inclination of the seat back, when the seat back is inclined rearwardly, the second lock gears 56 slide on a region of the inner peripheral surface of the second internal gear 54 in which no internal teeth are formed, and the second lock gears 56 do not engage with the second internal gear 54 until one of the paired second guide members 64 is bought into contact with an associated one of the protrusions 66c employed as the stoppers and, hence, the seat back returns to its original inclination.

As describe hereinabove, because the recliner adjuster according to the present invention can be reduced in size without reducing the locking strength, it can be effectively utilized in automotive vehicles in which a large load may be applied to the seat back.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A recliner adjuster comprising:
    a guide bracket adapted to be fixed to one of a seat cushion and a seat back that can pivot with respect to the seat cushion, the guide bracket having a radially outer surface;
    an internal gear adapted to be fixed to the other of the seat cushion and the seat back, the internal gear having a ring-shaped peripheral portion and a recess formed inside the ring-shaped peripheral portion, the ring-shaped peripheral portion having a radially outer surface constituting a radially outer surface of the internal gear, and the ring-shaped peripheral portion having a radially inner surface on which radially inwardly projecting teeth are formed;
    a cam interposed between the guide bracket and the internal gear;
    a pair of lock gears radially slidable in association with an operation of the cam, the pair of lock gears having radially outwardly projecting teeth for engagement with the radially inwardly projecting teeth of the internal gear; and
    a mounting ring for assembling the guide bracket and the internal gear together with the cam and the pair of lock gears interposed therebetween, the mounting ring having a flat annular portion and a cylindrical side portion, the cylindrical side portion having an inner surface of uniform diameter and being joined to one of the guide bracket and the internal gear;
    wherein the radially outer surface of the other of the guide bracket and the internal gear is held in sliding contact with said inner surface of uniform diameter to thereby radially position the other of the guide bracket and the internal gear.

2. The recliner adjuster according to claim 1, wherein the cylindrical side portion of the mounting ring is joined to the one of the guide bracket and the internal gear by laser welding.

3. The recliner adjuster according to claim 1, wherein the cylindrical side portion of the mounting ring is joined to the one of the guide bracket and the internal gear by $CO_2$ welding.

4. The recliner adjuster according to claim 1, wherein the mounting ring is made up of a plurality of mounting ring segments, adjacent portions of which are joined to the one of the guide bracket and the internal gear.

5. The recliner adjuster according to claim 1, further comprising a spring retainer provided on the mounting ring and a spiral spring for biasing the seat back forwardly, wherein the spiral spring is retained at one end thereof by a seat cushion side bracket and at the other end thereof by the spring retainer.

6. The recliner adjuster according to claim 5, wherein a movable range of the spring retainer is restricted by two portions of the seat cushion side bracket, thereby restricting a rotating range of the guide bracket with respect to the internal gear.

7. The recliner adjuster according to claim 1, wherein the mounting ring has a plurality of protrusions formed on an inner surface of the flat annular portion to provide a clearance between the inner surface of the flat annular portion and an outer side surface of said other of the guide bracket and the internal gear.

8. The recliner adjuster according to claim 1, wherein the uniform diameter of the inner surface of the cylindrical side portion of the mounting ring is substantially equal to a diameter of an outer peripheral surface of said one of the guide bracket and the internal gear.

9. The recliner adjuster according to claim 8 wherein the uniform diameter of the inner surface of the cylindrical side portion of the mounting ring is larger than a diameter of the outer peripheral surface of said other of the guide bracket and the internal gear.

10. The recliner adjuster according to claim 1, wherein the recess formed inside the ring-shaped peripheral portion of the internal gear has a bottom surface.

11. The recliner adjuster according to claim 10, wherein the lock gears are slidably accommodated within the recess such that the lock gears face the bottom surface of the recess.

* * * * *

UNITED STATES PATENT AND TRADEMARK OFFICE
CERTIFICATE OF CORRECTION

PATENT NO. : 7,648,204 B2
APPLICATION NO. : 11/317080
DATED : January 19, 2010
INVENTOR(S) : Yasukazu Oki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 739 days.

Signed and Sealed this

Sixteenth Day of November, 2010

David J. Kappos
*Director of the United States Patent and Trademark Office*